Nov. 17, 1936.  C. H. COLVIN  2,061,187
SPINDLE FOR TWISTING, SPINNING, AND WINDING MACHINES OR THE LIKE
Filed April 12, 1935
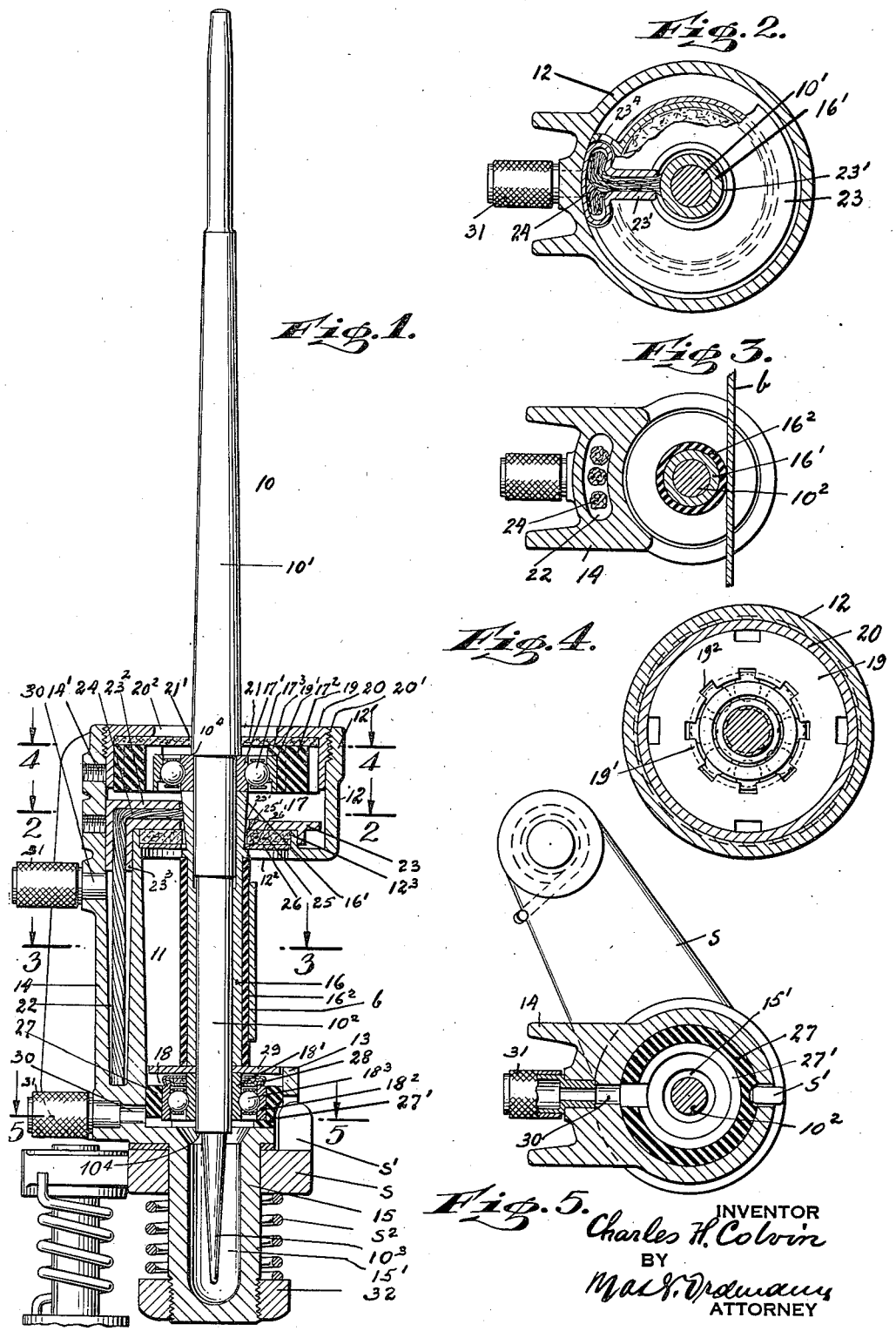
INVENTOR
Charles H. Colvin
BY
Max W. Ordmann
ATTORNEY Patented Nov. 17, 1936

2,061,187

UNITED STATES PATENT OFFICE 2,061,187

SPINDLE FOR TWISTING, SPINNING, AND WINDING MACHINES OR THE LIKE

Charles H. Colvin, Morristown, N. J., assignor to Columbus Spindle Co. Inc., Union City, N. J.

Application April 12, 1935, Serial No. 16,030

9 Claims. (Cl. 308—228)

This invention relates to throwing spindles for twisting, spinning and winding machines and has for its main and primary object to provide a spindle construction that will be capable of successfully operating at high speeds, say about 20,000 revolutions or more per minute, with minimum power consumption, minimum speed of driving belt and motor and minimum amount of thread breakage. Such speeds, which are approximately double the speeds at which spindles hitherto have been operated, are necessary in order to increase the rate of production for a given number of turns or twists of the threads per inch of length or to increase the number of turns or twists for a given rate of production.

The spindles hitherto used have been of three different types, to wit, those with plain bearing, those with internal anti-friction bearing and those with external anti-friction. With plain bearing, the bearing is merely a sleeve within the whorl. The axial load, due to the weight of the blade and bobbin, is carried on a step bearing, while the radial load of the driving belt is imposed on said sleeve bearing. The same is true as to spindles with internal anti-friction bearings except that the radial load is imposed on a ball bearing within the whorl replacing the sleeve of the plain bearing. With spindles with external anti-friction bearing there is a ball bearing above the whorl and a ball or plain bearing below the whorl.

Of these three, the first two of the above mentioned three types have been found entirely unsatisfactory for high speed operation. First, because the whorl would have to be of relatively large diameter to provide space within itself for bearings, which is objectionable because the large diameter whorl necessitates an unduly large high speed of belt and motor if high speed for the spindle is to be attained. Secondly, because of the lack of adequate means for damping vibrations. On the other hand, spindles of the third type have been found unsuccessful for the following reasons: First, because of the inadequate construction thereof, since the bearing below the whorl is ill adapted to carry the radial load imposed thereon. But, secondly and principally, because of the utter lack of effective lubricating means and hence, of the great difficulty and, in fact, impossibility, of adequately lubricating said bearings, particularly the bearing above the whorl.

My invention deals with spindles of the third type and has for its primary object to obviate the drawbacks of this type of spindles, by providing a construction which will render the spindle efficient for the high speeds desired.

A further object of my invention is to provide a spindle construction which will be durable, comparatively simple to manufacture, and in which the parts can be easily and quickly assembled and replaced whenever desired.

And a still further object is to provide a spindle with self-acting or automatic lubrication means so that attendance to lubrication will be greatly minimized and economy in the consumption of lubricant attained.

With these and other objects in view, my invention consists in the novel construction, combination and arrangement of parts, to be hereinafter more fully described and defined in the appended claims.

In the accompanying drawing which forms part of this specification, and in which similar reference characters denote corresponding parts, Fig. 1 is an elevational view of the spindle with the support thereof shown in longitudinal section;

Fig. 2 is a cross section on line 2—2 of Fig. 1;
Fig. 3 is a cross section on line 3—3 of Fig. 1;
Fig. 4 is a cross section on line 4—4 of Fig. 1;
Fig. 5 is a cross section on line 5—5 of Fig. 1, all said sections being seen in the direction of the arrows.

10 denotes the spindle proper or so-called blade whose upper part 10' is generally tapered and adapted to receive a standard throwing bobbin (not shown). 11 denotes the frame or support for said blade. This support includes two vertically superposed parallel cup shaped sockets 12, 13 projecting laterally from a vertical arm 14. The lower cup shaped socket is formed with a downwardly projecting cylindrical hollow or tubular extension or foot 15, which is adapted to be retained in the swing arm s of well known construction of a standard throwing frame (not shown). The part $10^2$ of the blade immediately below the bobbin carrying taper 10' is cylindrical and adapted to be rotatively supported in vertical position in the cup shaped sockets 12, 13 of said support. The lower end $10^3$ of said blade is tapered and adapted to extend centrally into the tubular or cylindrical foot 15 for the purpose hereinafter to be specified.

Press fitted or otherwise permanently fixed on the cylindrical part $10^2$ of the blade extending intermediate the cups 12, 13 is a sleeve 16 of relatively small diameter adapted to serve as the whorl, and whose circumference may be covered with a layer $16^2$ of high friction material such as rubber to enhance effective driving contact of the belt b (Fig. 3).

Mounted in the sockets 12 and 13 to rotatively bear the upper and lower ends of the cylindrical part $10^2$ of the blade, are anti-friction means of any suitable construction, preferably ball bearings, 17, 18, respectively, each having an inner race 17', 18', an outer race $17^2$, $18^2$, and balls $17^3$, $18^3$ therebetween. The outer race $17^2$ of the upper ball bearing may be tightly fitted or suitably secured within a cylindrical sleeve 19 of yielding or resilient material which may be provided on its upper face with a plurality of radially projecting lips 19' adapted to overlap the upper face of the outer race and spaced apart to form oil passages $19^2$. The yielding or resilient sleeve 19 is tightly fitted in a metal cap 20 whose outer circumference at its upper end is formed with screw thread 20' to mesh with the internally threaded end 12' of the upper cup shaped socket 12. This cap 20 is formed centrally with a circular opening $20^2$ whose diameter is relatively large to form a wide air passage leaving, however, a sufficiently wide annular flange around the upper face of the resilient member 19. Tightly fitted between the upper face of the yielding sleeve 19 and the inner face of said flange is a comparatively thin flexible washer 21 of porous material, which while permitting the passage of air, will trap the lubricant. This washer is provided centrally with a circular opening 21' of such a diameter that its edge will hug the spindle sufficiently to prevent the passage of oil between itself and the spindle. The metal cap 20 may be locked in adjusted position within the upper cup socket 12 by means of a set screw (not shown) working in a threaded bore 14' provided in the arm 14 of the frame.

Immediately below the upper ball bearing I provide a lubricating device therefor. The same comprises an oil reservoir 22 formed by a hollow in the arm 14 and extending longitudinally therethrough. This reservoir is closed at its lower end and open at its upper end terminating in the cup 12. The bottom of said cup 12 is provided concentrically with a circular opening $12^2$ having an inwardly extending sleeve-like projection $12^3$ on the upper edge of which is removably resting a disc shaped lid 23 of metal or the like. This lid is formed or has fixed to it a radially extending wick retaining mouth piece $23^2$ provided with a relatively short downwardly projecting hollow extension $23^3$ adapted to snugly fit into the upper open end of the oil reservoir 22 and through which the wick or oil feeder 24 will project into and down the reservoir to dip in the oil.

The upper part 16' of the whorl 16 is extended to project into the cup socket 12 and is cone shaped, tapering downwardly, the wider end of said taper 16' forming a shoulder on which bears the inner race 17' of the ball bearing 17. The lid 23 is formed centrally with a circular opening 23' slightly larger in diameter than that of the taper 16' at the particular point so as to form an air passage. Tightly fitted within the sleeve $12^3$ are a washer 25 of oil absorbing material and a relatively thin disc 26 of metal or the like, the same being retained in position by a shoulder at the bottom edge of sleeve $12^3$. Both said washers are formed with central circular openings 25', 26' respectively, slightly larger in diameter than the taper 16' at the particular points to form air passages.

The outer race $18^2$ of the lower ball bearing is also suitably secured in a yielding or resilient sleeve 27 of rubber or the like adapted to tightly fit in the lower cup shaped socket 13 and is advantageously formed at its lower end with an annular flange 27' overlapping the lower face of the outer race 18.

The upper face of said outer race is formed with an annular upstanding flange on which bears a suitable oil retaining lid or seal 28. 29 is a dust protector in form of a metal washer or the like bearing on the slightly upwardly extended inner race 18' and adapted to close the mouth of the cup 13.

Leading into the reservoir 22 and into the cup 13 are oil ducts 30 provided in the arm 14 and which are closed in well known manner by spring plungers 31.

The hollow 15' of the foot 15 of the support 14 forms an oil reservoir for the lower ball bearing and adapted to extend into said reservoir is the tapered tail $10^3$ of the blade to dip in the oil contained therein. At the junction of part $10^2$ of the blade and the tail $10^3$ a shoulder $10^4$ is formed whereby the oil creeping up said tapered tail will be dispersed entering the bearing in form of a mist.

It will be noted that the support 11 is adapted to be yieldingly and removably engaged by the wing arm s of the twisting frame. To this end the lower cup socket 13 and resilient sleeve 27 are recessed as shown (Figs. 1 and 5) for the engagement of a tongue s' provided on the swing arm s. This latter is held in contact with a washer bearing on the lower face of socket 13 by a pressure spring $s^2$ mounted between said arm and a nut 32 threaded on the lower end of the foot 15.

It is essential that with my spindle a step or foot support for the blade is entirely eliminated. Such supports were found to be objectionable because instead of centering the spindle and preventing axial vibrations, they frequently throw the spindle out of center and give rise to axial vibrations. This is due to the fact that to minimize friction the lower end of the spindle is generally tapered to a point and borne in a correspondingly shaped conical socket. By reason of combined radial and axial forces when the spindle revolves with high speed the pointed end thereof tends, in rising within its socket and on inclining, to ride up the conical wall of said socket, in consequence of which the extent of axial displacement and vibrations resulting therefrom are increased.

With my spindle the blade is effectively supported intermediary its ends, the axial load being carried by the inner race 18' of the lower bearing and the blade held against vertical displacement by the lips or flanges 19', 27' of the upper and lower ball bearings, which, however, due to their resiliency, permit the slight axial vibrations occasioned during high speed.

In operation, the spindle is adapted to be driven with speeds of about 20,000 or more revolutions per minute. The radial and axial oscillations of the spindle, due to centrifugal forces and uneven distribution of the revolving masses, such as spool or bobbin, and to the continuous change of the center of gravity as well as the lateral stress exerted on the whorl by the belt, are counteracted by the yielding sleeves 19 and 27 and the lips 19' and flange 27' thereof.

The most salient feature of my invention resides in the construction of my device affording effective lubrication of both upper and lower bearings. With the lower bearing 18 the oil contained in the reservoir 15', owing to the tapered tail end 10³ of the blade, the oil, by centrifugal force, as is well known, is caused to creep up said tapered tail of the blade and collect in the cup 13 wherein it will continuously and effectively lubricate the bearing.

With the upper bearing, the oil feeder or wick 24 will draw the oil from the reservoir and deposit it onto the taper 16' of the whorl, on which it will creep up, by centrifugal force as above stated. However, the tendency of the oil to creep up from the smaller to the larger end of the taper against the action of gravity is weak and is liable to be completely destroyed by an air current created around the taper moving in opposite direction. Such possibility is avoided with my invention. The centrifugal action of the rotating parts, even of such small diameter as that of the whorl, at high speed, builds up in the surrounding atmosphere, air pressure. This air pressure, owing to the narrow passages 25', 26' at the bottom of the taper and the relatively large passage 20² of the cup, sets up an air circulation in the upward direction through the cup 12. The air current enters the cup through the narrow air passages 25', 26' carrying with it the oil deposited on the taper and leaves the same through the porous washer 21 extending over the relatively larger diameter passage 20². This porous washer which, as stated, permits the passage of air but traps the oil which drops back into the cup, wherein it accumulates in the annular space formed between the inner wall of the cup 12 and the sleeve 12³ and drops back into the reservoir through a passage 23⁴ provided in the mouth piece 23².

Since the construction of my device may be modified in various ways without departing from the spirit of my invention, I do not wish to restrict myself to the details shown and described.

What I claim is:

1. In a spindle of the character described, a support rotatively supporting said spindle and formed with upper and lower sockets, anti-friction bearings in said sockets, a lubricant reservoir for said upper bearing and means for feeding the lubricant from said reservoir to said bearing, said means including a downwardly tapered member on said spindle projecting into the socket of the upper bearing, a wick extending into said reservoir and in contact with said tapered member and means for circulating an air current through said socket to aid the feeding of the lubricant along said tapered member to said bearing.

2. In a spindle according to claim 1, in which said air circulating means include narrow air passages at the bottom and wider air passages at the top of said socket and lubricant retaining means in said socket.

3. In a spindle according to claim 1, in which said spindle has fixedly mounted thereon a whorl of relatively small diameter, the upper end of which is conical and adapted to project into said upper socket and to taper downwardly, said tapered portion forming a part of the lubricant feeding means for said upper bearing.

4. In a spindle according to claim 1, in which means are provided for yieldingly supporting said anti-friction bearing in the upper socket including a rigid cap adjustably mounted in the mouth portion of said socket and a resilient sleeve fixed in said cap and embracing said anti-friction bearing, both circumferentially and around the upper outer margin thereof.

5. In a spindle according to claim 1, in which the means for yieldingly supporting the anti-friction bearing in the lower socket includes a resilient sleeve adapted to tightly fit in said socket and embrace said anti-friction roller, both circumferentially and around the lower outer margin thereof.

6. In a spindle according to claim 1, in which said spindle at its lower end is tapered and said support is provided with a hollow foot projecting centrally from the lower socket in longitudinal direction of said arm forming a lubricant reservoir for the lower bearing into which reservoir said tapered end freely projects.

7. In a spindle according to claim 1, lubricating means for the upper anti-friction bearing which includes a cap threadedly mounted in the mouth of said socket and formed with a relatively large central opening and a washer of porous material over said opening adapted to trap the lubricant but permit the passage of air through said opening.

8. In a spindle according to claim 1, in which the means for feeding a lubricant to the upper bearing includes a lubricant absorbing means below said bearing and lubricant retaining means above said bearing.

9. In a spindle of the character described a support rotatively supporting said spindle and formed with a socket, an anti-friction bearing in said socket, a lubricating means for said bearing, including a lubricant reservoir and a lubricant feeder, a downwardly tapered member on said spindle projecting into said socket and contacting with said feeder, and means for circulating an air current through said socket to aid the feeding of the lubricant along said tapered member into said bearing.

CHARLES H. COLVIN.